United States Patent
Scherer

(10) Patent No.: US 7,100,313 B2
(45) Date of Patent: Sep. 5, 2006

(54) MECHANICAL DIGGING DEVICE

(76) Inventor: Franz Josef Scherer, Schönheim, CH-6027 Römerswil (CH)

( * ) Notice: Subject to any disclaimer, the term of this patent is extended or adjusted under 35 U.S.C. 154(b) by 0 days.

(21) Appl. No.: 10/502,760

(22) PCT Filed: Jan. 31, 2003

(86) PCT No.: PCT/CH03/00079

§ 371 (c)(1),
(2), (4) Date: Jul. 28, 2004

(87) PCT Pub. No.: WO03/065790

PCT Pub. Date: Aug. 14, 2003

(65) Prior Publication Data

US 2005/0081409 A1    Apr. 21, 2005

(30) Foreign Application Priority Data

Feb. 4, 2002   (CH) .................... 0184/02

(51) Int. Cl.
*E01H 5/02*   (2006.01)

(52) U.S. Cl. ............... 37/265; 37/264; 254/131.5; 254/59

(58) Field of Classification Search ............. 37/265, 37/285; 294/54.5, 58, 59; 172/371; 254/131.5
See application file for complete search history.

(56) References Cited

U.S. PATENT DOCUMENTS

| | | | | |
|---|---|---|---|---|
| 1,264,640 A | * | 4/1918 | Hall ...................... 294/53.5 |
| 2,470,217 A | * | 5/1949 | McLoughlin ................ 37/434 |
| 2,846,785 A | * | 8/1958 | Underwood ................ 37/270 |
| 3,748,761 A | * | 7/1973 | Chetwynde .................. 37/265 |
| 4,130,953 A | * | 12/1978 | Bruno ........................ 37/265 |
| 4,865,372 A | * | 9/1989 | Gabriel ...................... 294/49 |
| 4,881,332 A | * | 11/1989 | Evertsen ..................... 37/285 |
| 5,133,582 A | * | 7/1992 | Rocha ........................ 294/58 |
| 6,086,049 A | * | 7/2000 | Sheils ..................... 254/131.5 |
| 6,663,085 B1 | * | 12/2003 | Dalon ..................... 254/131.5 |

FOREIGN PATENT DOCUMENTS

| | | |
|---|---|---|
| FR | 1 016 787 | 11/1952 |
| FR | 1 029 575 | 6/1953 |
| FR | 1 088 979 | 3/1955 |
| FR | 2 676 324 | 11/1992 |
| GB | 620 235 | 3/1949 |

\* cited by examiner

*Primary Examiner*—Thomas A Beach
(74) *Attorney, Agent, or Firm*—Wenderoth, Lind & Ponack, L.L.P.

(57) ABSTRACT

A mechanical digging device with a handle-like support is provided with a digging part near its bottom end and two grip arms on its upper end, a support part embodied on the bottom end of the support and a rotating device mounted on the support and connected to the digging part for laterally tilting the material on the digging part. The rotating device penetrates the support and the longitudinal axis of the rotating device extends parallel to the longitudinal axis of the digging part.

9 Claims, 4 Drawing Sheets

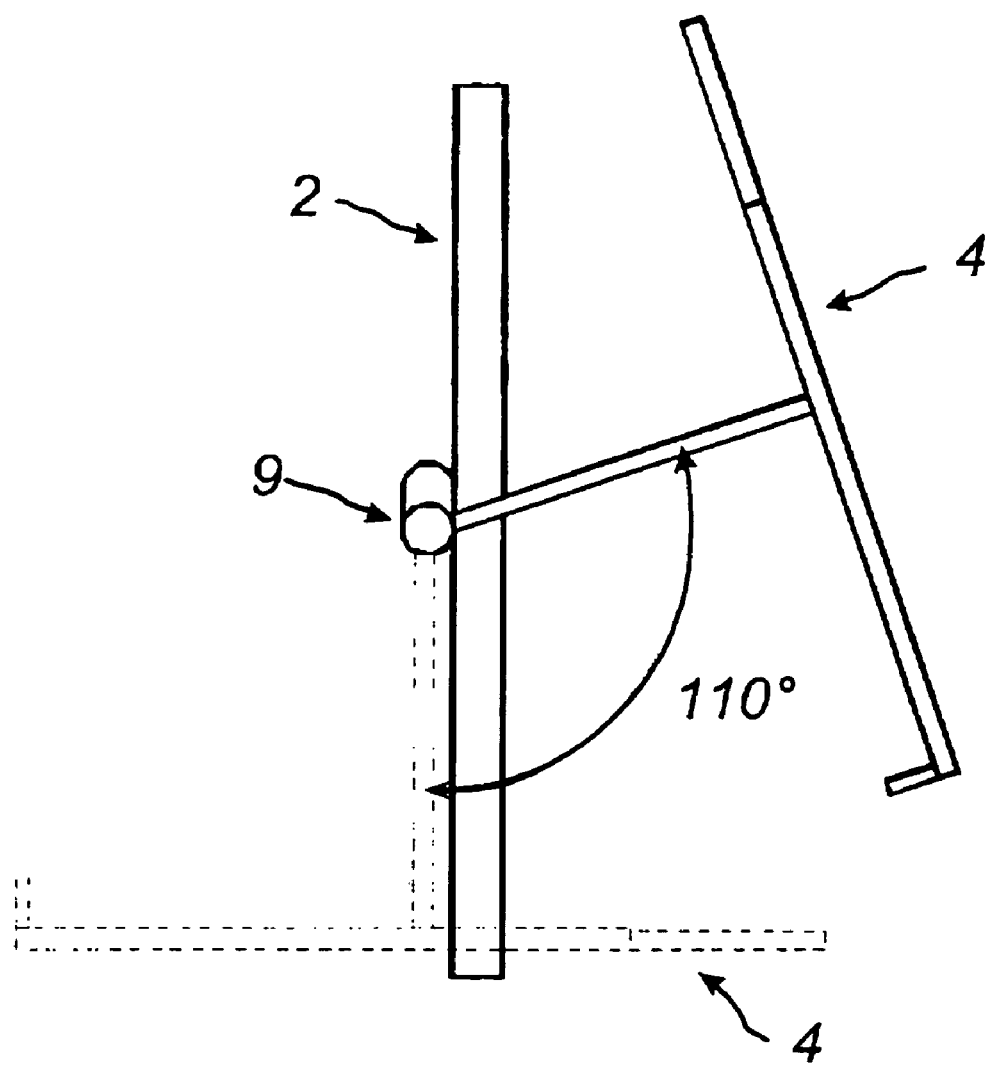

MECHANICAL DIGGING DEVICE

BACKGROUND OF THE INVENTION

The present invention relates to a mechanical digging device having a handle-like support.

The term "digging device" as used herein comprises all devices which are suitable and can be used for digging or turning over earth in particular.

DE-U1-298 16 690 discloses an add-on handle for spades or forks for easier handling when tilling ground. By means of the add-on handle, it is possible for the person to lift and turn the spade, following insertion into the ground, while standing in an upright position.

DE-U1-298 02 570, U.S. Pat. No. 6,086,049, FR-A12 773 663, GB 629 327, U.S. Pat. No. 4,881,332 and GB-619 410 disclose gardening devices, mostly in the form of spades, which are equipped with an additional lift-and-tilt device. By means of the latter device, the spade can be withdrawn with the material located on the spade blade and at the same time lifted up or pivoted up about a support point located at the bottom, so that the task is made easier with such a device. From the two last-mentioned documents, it is also known to provide the device with one or more rollers.

DE-375 247, FR-A1-2 676 324, FR-980 992 and FR-1 306 074 disclose mechanical digging devices in which it is likewise possible for the person using the device to work in an upright or at least almost upright position. By means of these devices, digging, lifting and turning or tipping-off the raised material is possible by rotating the digging part of the device.

In DE-848 117, a device is provided in which the rotating device for the digging part is mounted pivotably on the support of the device. In order to tip off the material located on the digging part, the rotating device is pivoted together with the digging part and at the same time rotated, so that the material located on the digging part falls off the latter and onto the ground.

SUMMARY OF THE INVENTION

It is an object of the invention to provide a mechanical digging device of the type mentioned above which is of simpler design and is easier to operate.

According to the invention, the rotating device is fitted to the support at a fixed location. As a result, it is easier to attach the rotating device and the service life thereof is increased. Moreover, actuation of the rotating device is made easier since in order to trigger a tilting movement it need simply be rotated and does not need to be pivoted on the support at the same time.

Advantageously, the rotating device passes through the support and the longitudinal axis of the rotating device runs parallel to the longitudinal axis of the digging part. The rotating device is thus held in a secure and stable manner in all operating states, and in order to tip off the earth lying on the digging part all that is required is a simple rotational movement about an essentially horizontal axis.

BRIEF DESCRIPTION OF THE DRAWINGS

Embodiments of the subject matter of the invention will be explained in more detail below with reference to the drawings, wherein all the features that are described and/or shown in the drawings form the subject matter of the present invention individually or in any desired combination, regardless of how they are combined or relate to one another in the claims. In the drawings:

FIG. 3b shows a schematic diagram of the mechanical digging device having a rotating angle of approximately 110°;

DETAILED DESCRIPTION OF THE INVENTION

Figure 1:
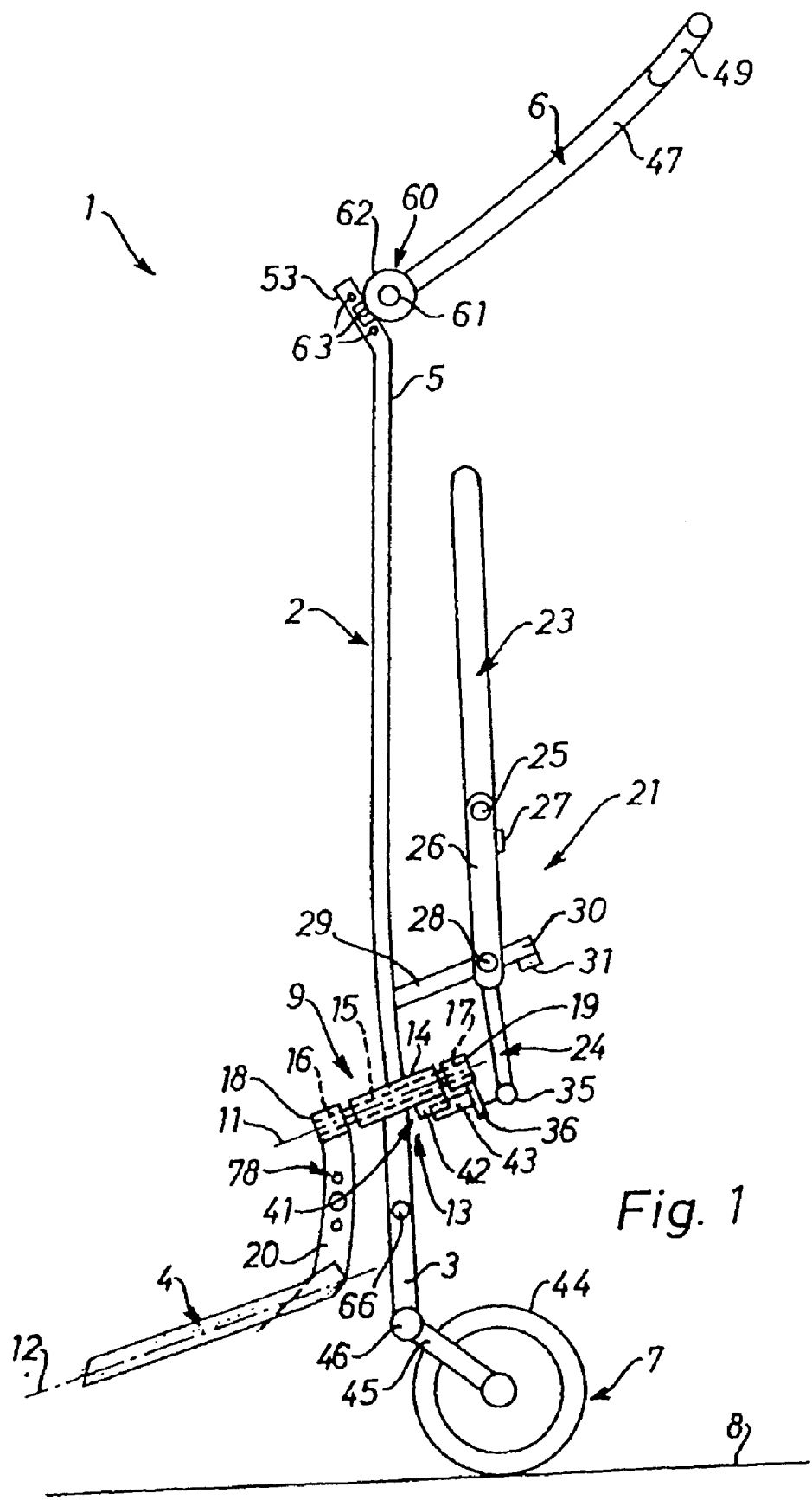
FIG. 1 shows a schematic side view of a mechanical digging device.

FIG. 1 schematically shows a mechanical digging device 1 in side view.

The digging device 1 has a handle-like support 2 which is designed for example in the form of a rectangular tube. The support 2 has near its lower end 3 a digging part 4 and at its upper end 5 two grip arms 6. Furthermore, the support 2 has at its lower end 3 a support part 7 by means of which the digging device 1 stands on the ground 8 in the position shown in FIG. 1.

Figure 2:
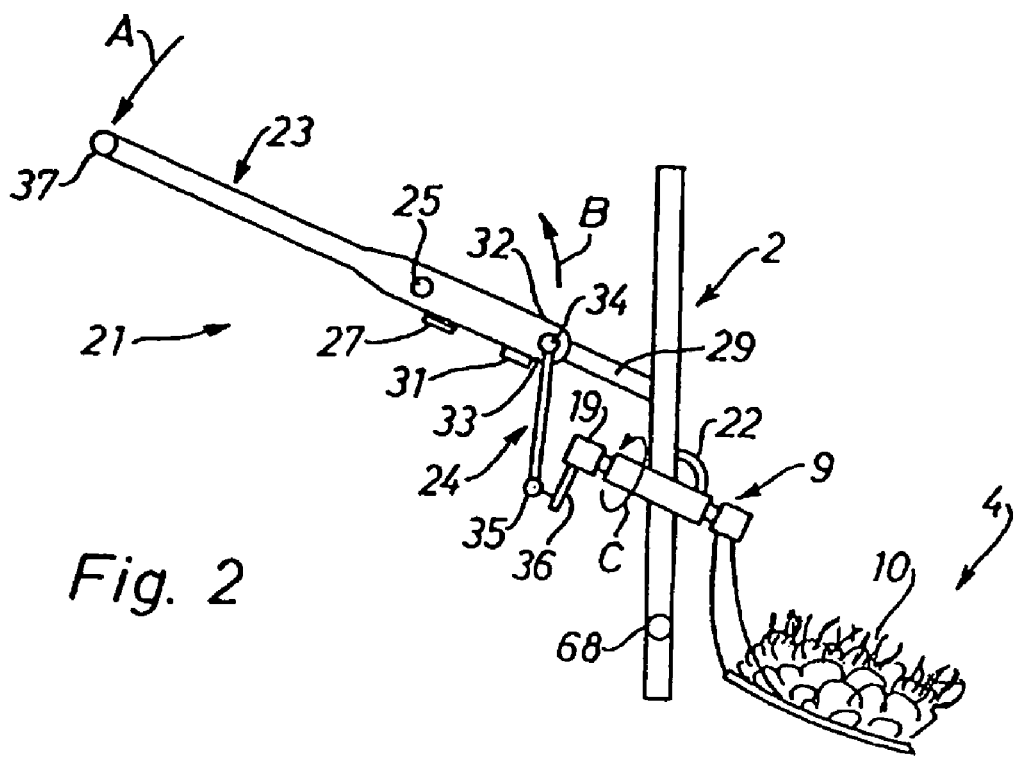
FIG. 2 shows a schematic partial side view of an actuating mechanism of the device in the rest position from the other side compared to FIG. 1.

Furthermore, the digging device has a rotating device 9 which is held on the support 2 and is connected to the digging part 4, which rotating device is likewise arranged in the lower part of the support 2 and is designed for laterally tipping off a material 10 located on the digging part 4 (cf. FIG. 2).

According to the invention, the rotating device 9 is fitted to the support 2 at a fixed location. As shown in FIG. 1, the rotating device 9 passes through the support 2 such that the longitudinal axis 11 of the rotating device 9 runs approximately parallel to the longitudinal axis 12 of the digging part 4.

The rotating device 9 is designed as a pivot bearing 13 comprising a cylindrical tube 14 and a hinge pin 15 which passes through the tube 14. Sleeves 18, 19 are pushed onto the front end 16 of the hinge pin 15 and the rear end 17 of the hinge pin 15 in a manner fixed against rotation, so that no relative movement is possible between the hinge pin 15 and the sleeves 18, 19. The front end 16 of the hinge pin 15 is connected via the sleeve 18 and a retaining plate 20 to the digging part 4, whereas the rear end 17 of the hinge pin 15 is connected via the sleeve 19 to an actuating mechanism 21 fitted to the support 2. As shown in FIGS. 1, 2, 3a and 5, the front end 16 of the hinge pin 15 and the support 2 enclose an angle 22 of preferably about 110°. For the sake of better clarity, said angle is shown only in FIG. 2.

The actuating mechanism 21 is shown more specifically in FIGS. 1 and 3 and comprises a foot pedal 23 fitted to the support 2, which foot pedal is connected via a rod assembly 24 to the rear end 17 of the hinge pin 15. The foot pedal 23 is mounted rotatably on a pivot arm 26 via a first bearing spindle 25, which pivot arm has a stop 27 for the foot pedal 23 near the first bearing spindle 25. The pivot arm 26 is in turn mounted rotatably on a support lever 29 by means of a pivot spindle 28, which support lever is connected fixedly to the support 2. The longitudinal axis of the support lever 28 runs approximately parallel to the longitudinal axis 11 of the rotating device 9.

At its outer free end, the support lever 29 has a stop 31 for the pivot arm 26. The pivot spindle 28 is therefore arranged on the support lever 29 between the end fixed to the support 2 and the outer free end 30.

Figure 3A:
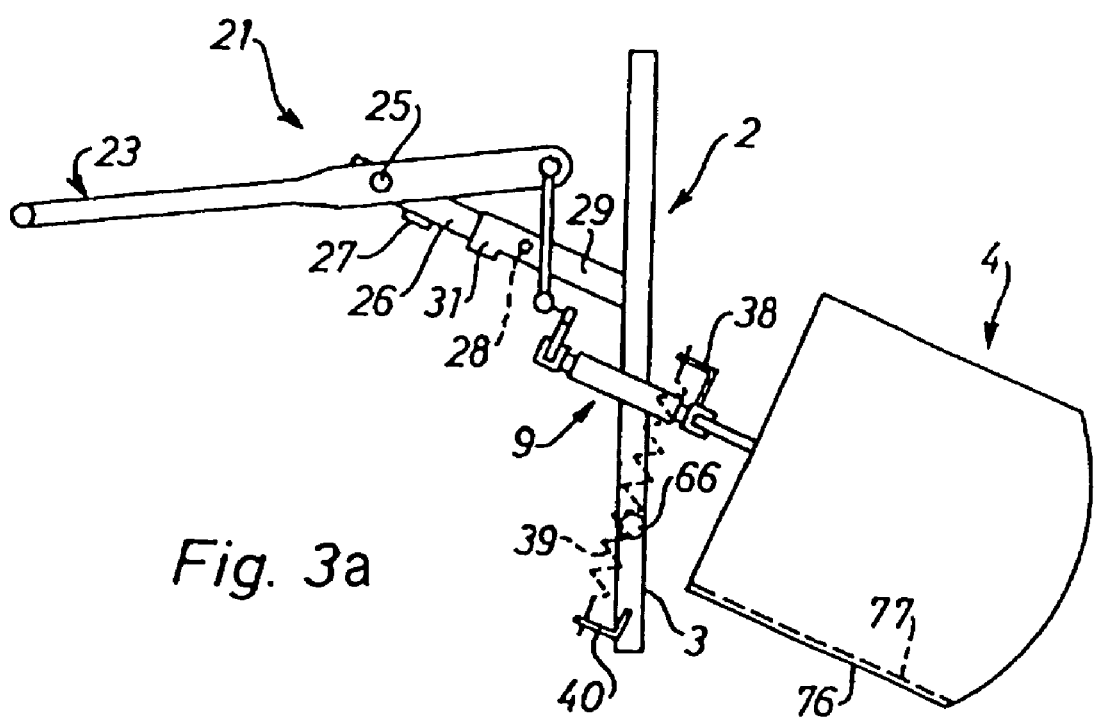
FIG. 3a shows a schematic diagram of the actuating mechanism of FIG. 2 in the working position.

As shown by a comparison between the diagrams of FIG. 1 on the one hand and of FIGS. 2 and 3a on the other hand, the foot pedal 23 is mounted such that it can pivot up toward the support 2, wherein according to one preferred embodiment of the invention the pivot spindle 28 of the foot pedal 23 coincides with a second bearing spindle 33 for the rod assembly 24 which is fixed at the front end 32 of the foot pedal 23.

The rod assembly 24 has two ball-and-socket joints 34, 35, wherein as shown in FIG. 2 the upper ball-and-socket joint 34 is connected rotatably to the front end 32 of the foot pedal 23 and forms the second bearing spindle 33 and wherein the lower ball-and-socket joint in FIG. 2 is fixed to the sleeve 19.

As shown in FIGS. 3a and 3b, the digging part 4 can thus be moved, by means of the rotating device 9 and the actuating mechanism 21, from its working position shown in FIGS. 1 and 2 into a tilted position rotated through preferably 110°, and vice versa, in order to laterally tip off the material 10 located on the digging part 4.

To do this, a force is exerted by the foot on a laterally protruding end piece 37 of the foot pedal 23 in FIG. 2, in the direction of arrow A. As a result, the foot pedal 23 pivots in the counterclockwise direction about the first bearing spindle 25, whereupon the front end 32 of the foot pedal 23 pivots upwards in the direction of arrow B so that a scissors-like structure is produced between the front section of the foot pedal 23 on the one hand and the pivot arm 26 and the support lever 29 on the other hand, as shown in FIG. 3a. By virtue of the upward pivoting of the front end 32 of the foot pedal 23, the rod assembly 24 with the ball-and-socket joints 34, 35 is also moved upwards, as a result of which the sleeve 19 is likewise rotated, via the short lever 36, in the counterclockwise direction shown by arrow C. As a result, the digging part 4 is finally rotated from its working position shown in FIG. 2 to its tilted position shown in FIG. 3a, so that the raised material 10 falls off the digging part 4 and onto the ground.

Figure 4:
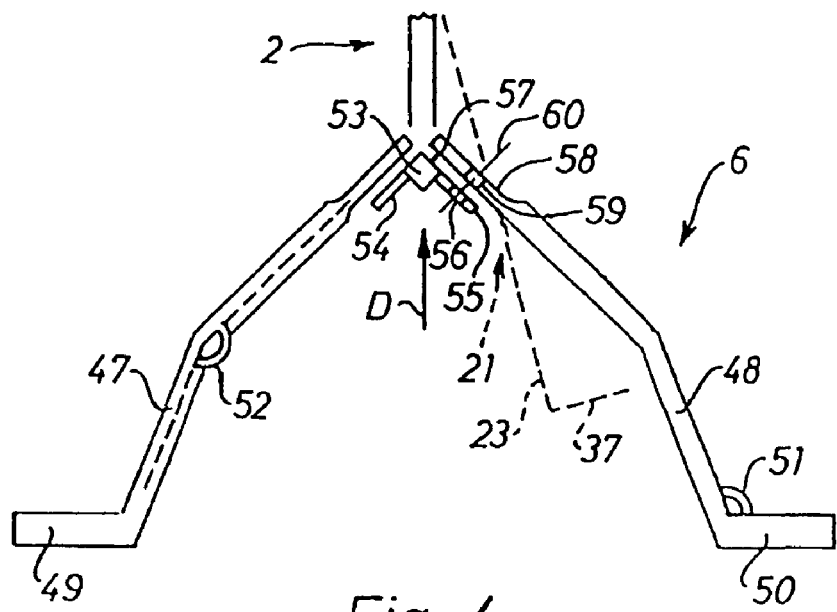
FIG. 4 shows a schematic partial plan view of the digging device.

In the plan view shown in FIG. 4, the actuating mechanism 21 is shown in dashed line, and it can be seen that the actuating mechanism extends obliquely away from the support 2 towards the back right, so that the protruding end piece 37 of the foot pedal 23 can be easily pressed down by the foot. By virtue of the oblique arrangement of the actuating mechanism, it is possible for the entire digging device 1 to be pushed along over the ground 8 in the direction of arrow D in FIG. 4 by means of the support part 7 without the person operating the device hitting his right leg against the actuating mechanism during the forward movement.

As shown in FIG. 3a, an upper bellcrank 38 is fixed to the front sleeve 18, on which bellcrank one end of a tension spring 39 (shown only in dashed line in FIG. 3a) is suspended. The other end of the tension spring 39 is suspended on a lower bellcrank 40, which is fixedly connected to the lower end 3 of the support 2. As a result of the spring force of the tension spring 39, the digging part 4 automatically returns from its tilted position shown in FIG. 3a to its working position shown in FIG. 2, provided that no force continues to be exerted on the foot pedal 23 in the direction of arrow A. As a result of the spring force of the tension spring 39, the rotating device 9 is rotated in the clockwise direction, that is to say counter to the arrow C, whereupon the short lever 36 pivots downwards and thereby the rod assembly 24 and the front end 32 of the foot pedal are also moved downwards back into the working position shown in FIG. 2.

In FIG. 1, a stop device 41 comprising a stop 42 fixed to the tube 14 and a stop mandrel 43 fixed to the short lever 36 is formed on the rotating device 9. In the working position shown in FIG. 1, the stop mandrel 43 bears against the right side of the stop 42, so that the digging part 4 is securely held in its working position on account of the force of the tension spring 39. It can be seen that the digging part 4 is prestressed into its working position by means of the tension spring 39 and the stop device 41. For the sake of better clarity, the stop device 41 is not shown in FIGS. 2 and 3a. Likewise, the tension spring together with the bellcrank are not shown in FIG. 2.

As shown in FIG. 1, the support part 7 is a roller 44 or cylinder mounted rotatably at the lower end 3 of the support 2, which roller or cylinder is fixedly connected to the support 2 via a forked lever 45. In the region of the point of connection between the lower end 3 of the support 2 and the forked lever 45 there is a foot lever 46 which protrudes to the left from the side of the support and can be used to make the digging part 4 pass into the ground 8.

FIG. 4 schematically shows a partial plan view of the digging device. It can be seen that the two grip arms 6 are designed as handlebars and are fixed in a height-adjustable manner on the support 2. For this purpose, the grip arm 6 has a left handle arm 47 and a right handle arm 48, each having protruding handles 49, 50 which enclose an angle 51 of approximately between 100° and 120° with their respective handle arm 47, 48.

In the diagram shown in FIG. 4, the handle arms 47, 48 are designed to be bent. However, it is also possible to design the handle arms in each case to be angled with a front section that points towards the support 2 and a rear section that points towards the respective handle, wherein the angle 52 enclosed by the sections is approximately 160°.

The upper end 5 of the support 2 is angled forwards as shown in FIGS. 1 and 4. The grip 6 is fastened adjustably on an angled piece 53. As shown in FIG. 4, the angled piece 53 is a rectangular piece of tube, on the rear side surfaces of which fixing plates 54, 55 extend, said fixing plates in each case having a bore 56 with an inner thread. On the front side surfaces of the angled piece 53 there are a number of bores 63 (cf. FIG. 1), in which a pin 57 of a front, plate-shaped end section 58 of each handle arm 47, 48 engages. In addition, each front end section of the handle arms has a through-bore 59.

In order to fix each handle arm to the angled piece 53, there is furthermore provided in each case a fixing device 60 in the form of a bolt 61 with a wheel 62 (cf. FIG. 1). The bolt 61 can in each case be pushed through the through-bore 59 of the handle arm and, once the pin 57 of each handle arm has been inserted into one of the bores 63 of the angled piece, be screwed to the bore 56 with the inner thread, so that each handle arm 47, 48 is fixedly, but releasably and adjustably, connected to the angled piece 53 of the support 2. It is clear that the bores 63, as shown in FIG. 1, are arranged in a part-circle around the bore 56 on the angled piece.

Figure 5:
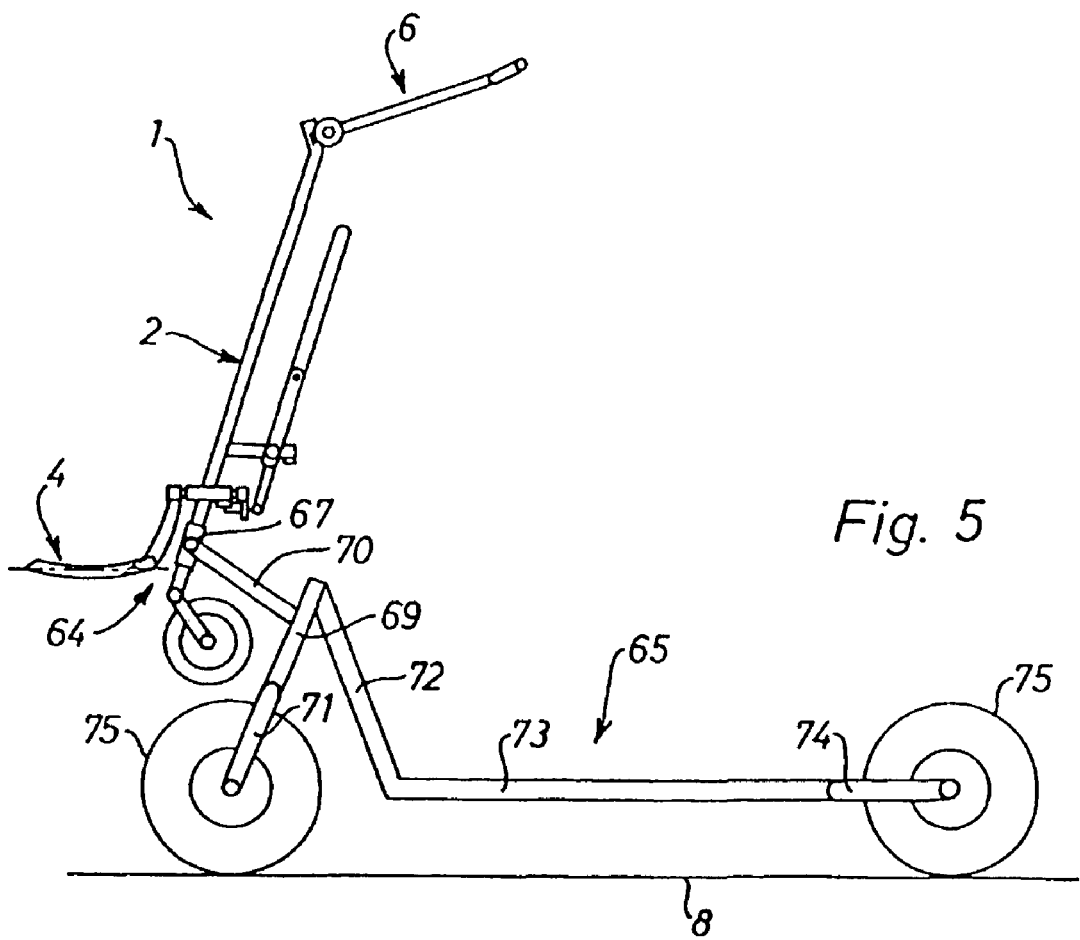
FIG. 5 shows a schematic side view of a scooter connected to the digging device.

One preferred development of the mechanical digging device 1 according to the invention is shown in a schematic side view in FIG. 5.

As shown in FIGS. 1 and 2, the support 2 has, near to its lower end 3, a further fixing device 64 for attaching a scooter 65. This further fixing device 64 is preferably designed in the form of a bore 66 that passes through the support 2 and a nut-and-bolt connection 67, wherein the bolt can be screwed into a nut 68 which is permanently fixed to one side (in FIG. 2 the right-hand side) of the support 2. In the diagram shown in FIG. 3, the nut 68 fixed to the support is omitted for the sake of better clarity. Only the bore 66 is provided here.

The further fixing device 64 comprises a half-shell which is not shown in any more detail and in the position shown in FIG. 5 securely engages around a section of the support 2 when the nut-and-bolt connection 67 is screwed in. It is clear that, when said connection 67 is released, the digging device 1 can be detached from the scooter 65.

The scooter 65 is provided in a conventional manner with a front bar 69, which is connected via a connecting bar 70 to the further fixing device 64, and a front wheel fork 71. Connected to the rear of the front bar 69 is a downwardly directed retaining bar 72 and connected to the latter is a horizontal foot board 73 which terminates in a rear wheel fork 74. Within the front wheel fork 71 and the rear wheel fork 74 there is in each case a wheel or tire 75 which is mounted rotatably in the respective fork.

It is clear that the front bar 69 allows a rotatable mounting of the front wheel fork 79. From the diagram shown in FIG. 5 it can be seen that, while the digging device 1 is connected to the scooter 65 by means of the further fixing device 64, the support 2 of the device 1 is designed and arranged as the steering rod and the two grip arms 6 of the device 1 are designed and arranged as the handlebars of the scooter 65.

As shown merely schematically in FIG. 3a, the digging part 4 is provided on its left side 76 with a high edge 77. In the case of a digging part of conventional size, the height of the edge 77 is about 2 cm. This raised edge means that the material located on the digging part remains on the digging part for as long as possible in the event of a rotating or tilting movement, that is to say when moving the digging part from its working position to its tilted position, and then is tipped off the digging part as a whole, so to speak.

The digging part 4 may be designed in the form of a shovel shown in FIGS. 2, 3a, and 5 or else in the form of a fork provided with various prongs.

The mechanical digging device 1 according to the invention can be operated as follows.

Firstly, the digging part 4 is pushed into the ground 8 as in the case of a conventional spade, in that firstly the support 2 is pivoted forwards such that the digging part 4 can be inserted into the ground at the desired angle. The insertion of the digging part 4 into the ground takes place as follows: the hands of the person using the device are located on the protruding handles 49, 50 of the two grip arms 6 and the left foot is pressed firmly on the foot lever 46. In another embodiment (not shown), the foot lever 46 may also be omitted. In this case, the digging part 4 is pressed into the ground by placing for example the left foot on the upper edge of the digging part.

The digging part 4 can be inserted into the ground 8 until the support part 7 in the form of the roller 44 rests on the ground 8. In this position, the support 2 projects obliquely forwards; the arms of the person operating the device are stretched upwards and forwards.

In a second step, the entire device is pivoted rearwards about the hinge pin of the support part 7, wherein a lever arm continuing the longitudinal support 2 and the relatively widely projecting grip arms 6 is available for this pivoting movement. In the opposite direction, the digging part 4 is arranged relatively close to the support part 7. Using a simple pivoting movement, in which the grip arms 6 are pulled backwards, that is to say towards the person's body (or more precisely on either side of the body), the support part 7 rests on the ground 8, so that it is possible to lift the digging part 4 together with the material that has been dug. During this pivoting movement, the person operating the device moves his arms from the position in which they are stretched upwards and forwards into a lower position in which they lie on either side of his body, without it being necessary to bend his back. The arms and hands which are stretched downwards on both sides thus provide the necessary counterforce when pressing the foot pedal. The arms and hands which are stretched downwards on both sides are then drawn up until both the grip arms come into the ground position on both sides of the body (with arms stretched downwards), without it being necessary to bend one's back. At the end of this second step, the digging device is in a position in which it is slightly pivoted backwards compared to FIG. 1, with the digging part 4 in an approximately horizontal position.

In a third and final step, the actuating mechanism 21 is used by pressing down on the foot pedal 23 and pivoting the rotating device 9 and hence the digging part 4 in the direction of arrow C in FIG. 2. As a result, the device is moved from its working position shown in FIG. 2 to its tilted position shown in FIG. 3, by means of which the material located on the digging part is tipped off the digging part. This tipping-off is carried out for example at the place where the material was previously lifted by the digging process.

The device according to the invention is then moved slightly backwards, that is to say counter to the direction of arrow D, wherein the roller 44 rolls over the ground 8. The next digging or turning-over operation then begins.

It is clear that a height adjustment of the grip arms 6 and hence an adaptation of the position of the grip arms to the person operating the device is possible by means of the fixing device 60 described above.

In order to attach the digging device 1 to the scooter 65, the nut-and-bolt connection 67 is fixed to the lower end 3 of the support 2 by means of the further fixing device 64. In the process, the bolt of said connection is pushed through the bore 66 of the support and screwed into the nut 68 (cf. FIG. 2). The combination of mechanical digging device 1 and scooter 65 can then be used like a normal scooter, wherein it is also possible to attach items of luggage to the digging part 4 or to provide the digging part 4 with rubber padding in order to lessen the risk of injuries to other people.

According to a further embodiment which is shown only schematically in FIG. 1, the retaining plate 20 is designed such that the digging part 4 is releasably connected to the support 2. For this purpose, a change-over device 78 (shown schematically) is provided on the retaining plate 20. By means of this changeover device 78, the digging part 4 is designed such that it can be removed. The digging part 4 can also be folded up. For shipment, for example, it is more practical simply to fold the digging part 4 up rather than remove it. For this reason, the digging part 4 is removed at most when for example the digging shovel is replaced by a fork or when the device is used only for the scooter.

In addition, as shown in FIG. 1, the actuating mechanism 21 can be moved from the rest position shown in FIG. 2 to the working position shown in FIG. 1. Moreover, as mentioned above, the handle arms 47, 48 of the two grip arms 6 may be pivoted away by means of an easily releasable screw or removed completely from the support 2 so that the device according to the invention takes up only a small volume in the folded state.

A mechanical digging device is thus provided which is designed in a simple manner and is easy to operate.

The invention claimed is:

1. A mechanical digging device comprising:
a handle-like support;
a digging part disposed near a lower end of said handle-like support;
grip arms disposed at an upper end of said handle-like support;
a support part mounted directly at said lower end of said handle-like support; and
a rotating device which is disposed on said handle-like support and is connected to said digging part,
wherein said rotating device is fitted to said handle-like support at a fixed location,
wherein said support part is a roller or a cylinder that is rotatably mounted at said lower end of said handle-like support,
wherein said rotating device is a pivot bearing,
wherein a hinge pin of said pivot bearing is connected at a front end thereof to said digging part, and at a rear end thereof to an actuating mechanism fixed to said support,
wherein said actuating mechanism has a foot pedal fixed to said handle-like support, and
wherein said foot pedal is connected via a rod assembly to said rear end of said hinge pin.

2. The digging device as claimed in claim 1,
wherein said foot pedal is mounted such that it can pivot up toward said handle-like support, and
wherein a pivot spindle of said foot pedal is coincident with a bearing spindle of said rod assembly which is fixed to said foot pedal.

3. A mechanical digging device comprising:
a handle-like support,
a digging part disposed near a lower end of said handle-like support;
grip arms disposed at an upper end of said handle-like support;
a support part mounted directly at said lower end of said handle-like support; and
a rotating device which is disposed on said handle-like support and is connected to said digging part,
wherein said rotating device is fitted to said handle-like support at a fixed location,
wherein said support part is a roller or a cylinder that is rotatably mounted at said lower end of said handle-like support,
wherein said rotating device is a pivot bearing,
wherein a hinge pin of said pivot bearing is connected at a front end thereof to said digging part and at a rear end thereof to an actuating mechanism fixed to said support,
wherein said digging part can be moved, by means of said rotating device and said actuating mechanism, from a working position into a tilted position rotated through approximately 110°, and vice versa, in order to laterally tip off a material located on said digging part, and
wherein said digging part is prestressed into the working position by means of a spring and a stop device.

4. A mechanical digging device comprising:
a handle-like support;
a digging part disposed near a lower end of said handle-like support;
grip arms disposed at an upper end of said handle-like support;
a support part mounted directly at said lower end of said handle-like support; and
a rotating device which is disposed on said handle-like support and is connected to said digging part,
wherein said rotating device is fitted to said handle-like support at a fixed location,
wherein said support part is a roller or a cylinder that is rotatably mounted at said lower end of said handle-like support,
wherein said handle-like support has, at said lower end thereof, a fixing device for attaching a scooter, and
wherein said fixing device comprises a bore passing through said handle-like support and a nut-and-bolt connection.

5. The digging device as claimed in claim 4, wherein when a scooter is connected to said digging device, said handle-like support is utilized as a steering rod and said grip arms are utilized as the handlebars of said scooter.

6. A mechanical digging device comprising:
a handle-like support;
a digging part disposed near a lower end of said handle-like support;
grip arms disposed at an upper end of said handle-like support;
a support part mounted directly at said lower end of said handle-like support; and
a rotating device which is disposed on said handle-like support and is connected to said digging part,
wherein said rotating device is fitted to said handle-like support at a fixed location,
wherein said support part is a roller or a cylinder that is rotatably mounted at said lower end of said handle-like support,
wherein said rotating device is a pivot bearing,
wherein a hinge pin of said pivot bearing is connected at a front end thereof to said digging part and at a rear end thereof to an actuating mechanism fixed to said support,
wherein said front end of said hinge pin and said handle-like support enclose an angle of approximately 110°,
wherein said actuating mechanism has a foot pedal fixed to said handle-like support, and
wherein said foot pedal is connected via a rod assembly to said rear end of said hinge pin.

7. A mechanical digging device comprising:
a handle-like support;
a digging part disposed near a lower end of said handle-like support;
grip arms disposed at an upper end of said handle-like support;
a support part mounted directly at said lower end of said handle-like support; and
a rotating device which is disposed on said handle-like support and is connected to said digging part,
wherein said rotating device is fitted to said handle-like support at a fixed location,
wherein said support part is a roller or a cylinder that is rotatable mounted at said lower end of said handle-like support,
wherein said rotating device is a pivot bearing,
wherein a hinge pin of said pivot bearing is connected at a front end thereof to said digging part, and at a rear end thereof to an actuating mechanism fixed to said support,
wherein said front end of said hinge pin and said handle-like support enclose an angle of approximately 110°,
wherein said digging part can be moved, by means of said rotating device and said actuating mechanism, from a working position into a tilted position rotated through approximately 110°, and vice versa, in order to laterally tip off a material located on said digging part, and wherein said digging part is prestressed into the working position by means of a spring and a stop device.

8. The digging device as claimed in claim 1, wherein said digging part can be moved, by means of said rotating device and said actuating mechanism, from a working position into a tilted position rotated through approximately 110°, and vice versa, in order to laterally tip off a material located on said digging part, and wherein said digging part is prestressed into the working position by means of a spring and a stop device.

9. The digging device as claimed in claim 2, wherein said digging part can be moved, by means of said rotating device and said actuating mechanism, from a working position into a tilted position rotated through approximately 110°, and vice versa, in order to laterally tip off a material located on said digging part, and wherein said digging part is prestressed into the working position by means of a spring and a stop device.

\* \* \* \* \*